(12) United States Patent
Anders et al.

(10) Patent No.: US 10,161,460 B2
(45) Date of Patent: Dec. 25, 2018

(54) HOT UPSET SOLID SHAFT SUB-ASSEMBLY

(71) Applicant: Steering Solutions IP Holding Corporation, Saginaw, MI (US)

(72) Inventors: William S. Anders, Merrill, MI (US); Daniel C. Simon, Freeland, MI (US); Patrik M. Ryne, Midland, MI (US); Troy A. Daenzer, Reese, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 492 days.

(21) Appl. No.: 14/283,909

(22) Filed: May 21, 2014

(65) Prior Publication Data

US 2014/0349773 A1    Nov. 27, 2014

Related U.S. Application Data

(60) Provisional application No. 61/825,860, filed on May 21, 2013.

(51) Int. Cl.
*B62D 1/16* (2006.01)
*F16C 3/02* (2006.01)
(Continued)

(52) U.S. Cl.
CPC ............. *F16D 3/387* (2013.01); *B62D 1/16* (2013.01); *F16C 3/02* (2013.01); *F16C 3/023* (2013.01);
(Continued)

(58) Field of Classification Search
CPC .. B23P 11/025; B62D 1/16; F16C 3/02; F16C 3/023; F16C 2226/52;
(Continued)

(56) References Cited

U.S. PATENT DOCUMENTS

| 4,110,051 A | 8/1978 | Mettler et al. |
| 4,213,351 A * | 7/1980 | Rowlinson ............... B21K 1/06 |
| | | 72/370.11 |

(Continued)

FOREIGN PATENT DOCUMENTS

| CN | 101429973 A | 5/2009 |
| CN | 102224348 A | 10/2011 |

(Continued)

OTHER PUBLICATIONS

Translation of JP 2007-040420. Tokioka, et al. Method of Manufacturing Drive Shaft. Feb. 15, 2007.*

(Continued)

*Primary Examiner* — Josh Skroupa
(74) *Attorney, Agent, or Firm* — Cantor Colburn LLP

(57) ABSTRACT

A solid shaft sub-assembly includes a solid shaft having a first portion and a second portion, and a yoke including an inner wall defining an aperture to receive the solid shaft. The aperture has a non-circular first cross-sectional profile, and the solid shaft first portion is positioned within the aperture and is deformed such that the first portion is formed with a second cross-sectional profile complementary to the first cross-sectional profile to axially and torsionally couple the solid shaft to the yoke.

12 Claims, 5 Drawing Sheets

(51) Int. Cl.
*F16D 1/072* (2006.01)
*F16D 3/38* (2006.01)
*F16D 1/10* (2006.01)

(52) U.S. Cl.
CPC .......... *F16D 1/072* (2013.01); *F16C 2226/52* (2013.01); *F16C 2326/24* (2013.01); *F16D 2001/102* (2013.01); *Y10T 29/49835* (2015.01); *Y10T 29/49938* (2015.01)

(58) Field of Classification Search
CPC ...... F16C 2326/24; F16D 1/072; F16D 3/387; F16D 2001/102; Y10T 29/49835; Y10T 29/49938; Y10T 403/4634; Y10T 403/49
USPC ................ 464/134, 185, 182; 403/242, 274; 29/447, 522.1
See application file for complete search history.

(56) References Cited

U.S. PATENT DOCUMENTS

| | | | | |
|---|---|---|---|---|
| 5,090,834 | A * | 2/1992 | Yamamoto | F16D 1/072 29/523 |
| 5,913,633 | A * | 6/1999 | Shimizu | F16D 1/072 403/279 |
| 6,406,374 | B1 * | 6/2002 | Kanamaru | B21D 26/047 403/359.1 |
| 8,556,737 | B2 * | 10/2013 | Yamauchi | B60B 27/00 464/178 |
| 9,404,541 | B2 * | 8/2016 | Hoppe | F16D 1/101 |
| 2011/0219907 | A1 | 9/2011 | Rietzler | |

FOREIGN PATENT DOCUMENTS

| | | | |
|---|---|---|---|
| DE | 102008004924 A1 * | 7/2009 | ......... B60B 27/0005 |
| DE | 102010002494 A1 | 9/2011 | |
| EP | 1179440 A2 * | 2/2002 | ............ B60B 27/00 |
| GB | 1471539 | 4/1977 | |
| GB | 1471539 A | 4/1977 | |
| GB | 2105441 A * | 3/1983 | ............... B62D 1/16 |
| JP | 10267040 A * | 10/1998 | ............... F16D 1/02 |
| JP | 2007040420 A * | 2/2007 | ............... F16D 3/26 |
| JP | 2012112509 A * | 6/2012 | ............. F16D 1/072 |

OTHER PUBLICATIONS

Translation of JP 2012-112509 A. Maeda, et al. Method and Structure for Coupling Between Shaft and Yoke. Jun. 14, 2012.*
Chinese Office Action for Application No. 201410215231.4 dated Feb. 6, 2016; English translation included.
European Search Report for EP Application No. 14169306.9 dated Aug. 7, 2014; 8 pages.
European Office Action for EP Application No. 14169306.9 dated Sep. 21, 2016.

* cited by examiner

HOT UPSET SOLID SHAFT SUB-ASSEMBLY

CROSS-REFERENCES TO RELATED APPLICATIONS

This patent application claims priority to U.S. Provisional Patent Application Ser. No. 61/825,860, filed May 21, 2013, which is incorporated herein by reference in its entirety.

FIELD OF THE INVENTION

The present disclosure generally relates to shaft assemblies and, more specifically, to solid shaft sub-assemblies for a vehicle intermediate shaft.

BACKGROUND OF THE INVENTION

Intermediate shafts are typically comprised of two main components: a tubular sub-assembly and a solid shaft sub-assembly. This combination allows for telescoping of the intermediate shaft so that it may be installed in a car, and potentially collapse during a crash scenario.

The solid shaft sub-assembly is traditionally made by an interference fit between a solid shaft and a yoke. The interference is typically created by forming a serration on the yoke, and forming a complimenting but slightly different serration on the solid shaft. These slightly differing serrations create an overlap of the serration flanks on the yoke to the serration flanks on the shaft. This connection holds together the yoke and shaft so that they may form the solid shaft sub-assembly.

Some solid shaft sub-assemblies may undergo a "staking" operation to add an axial retention feature after the yoke and shaft are pressed together. This feature or "stake" is a small patch of metal on the solid shaft that is deformed past the original outer diameter.

However, with some known solid shaft sub-assemblies, the serrations may be difficult to design, difficult to manufacture, and may be easily damaged. Additionally, the interference connection may be limited in the axial retention force it can withstand before failing. Because of this limited retention force, a redundant axial retention feature is required. Traditional solid shaft sub-assemblies may also encounter difficulties during assembly. For example, the required load to press the two components together may be too high or too low, the components may not press together on a parallel path, the serrations of the components may not connect as desired, or the components may not press together for the desired distance. Accordingly, it is desirable to provide an improved solid shaft sub-assembly.

SUMMARY OF THE INVENTION

In one aspect, a solid shaft sub-assembly is provided. The solid shaft sub-assembly includes a solid shaft having a first portion and a second portion, and a yoke including an inner wall defining an aperture to receive the solid shaft. The aperture has a non-circular first cross-sectional profile, and the solid shaft first portion is positioned within the aperture and is deformed such that the first portion is formed with a second cross-sectional profile complementary to the first cross-sectional profile to axially and torsionally couple the solid shaft to the yoke.

In another aspect, an intermediate shaft for a steering column assembly is provided. The intermediate shaft includes a tubular shaft, a solid shaft having a first end and a second end, the first end inserted into the tubular shaft, and a yoke including an inner wall defining an aperture to receive the solid shaft second end. The aperture has a non-circular first cross-sectional profile, and the solid shaft second end is positioned within the aperture and is deformed such that the solid shaft second end is formed with a second cross-sectional profile complementary to the first cross-sectional profile to axially and torsionally couple the solid shaft to the yoke.

In yet another aspect, a method of assembling a solid shaft sub-assembly is provided. The method includes providing a solid shaft having a first portion and a second portion, and providing a yoke having an inner wall defining an aperture to receive the solid shaft, the aperture having a non-circular first cross-sectional profile. The method further includes inserting the solid shaft first portion into the aperture, and axially and torsionally coupling the solid shaft to the yoke by deforming the solid shaft first portion such that the first portion is formed with a second cross-sectional profile complementary to the first cross-sectional profile.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
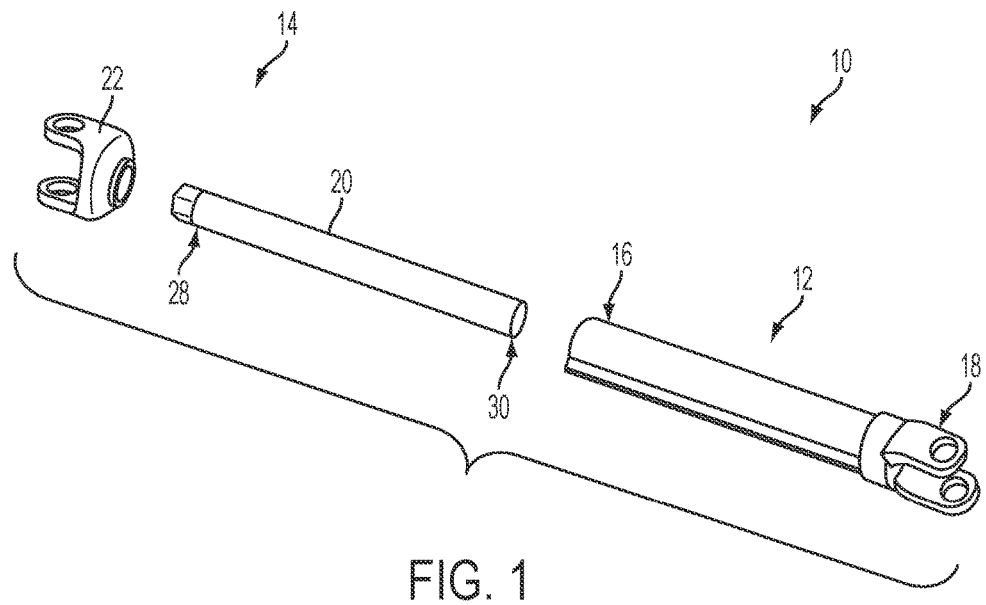
FIG. 1 is a perspective view of an exemplary intermediate shaft assembly having a solid shaft sub-assembly, and before assembly.

Referring now to the Figures, where the invention will be described with reference to specific embodiments, without limiting same, FIG. 1 illustrates an exemplary intermediate shaft assembly 10 that generally includes a tubular shaft sub-assembly 12 and a solid shaft sub-assembly 14. Tubular shaft 12 generally includes an open end 16 and a yoke end 18. In the exemplary embodiment, intermediate shaft assembly 10 is configured for use in a vehicle steering column assembly (not shown). However, the shaft assemblies 10, 14 described herein may be used in any other suitable system.

Figure 2:
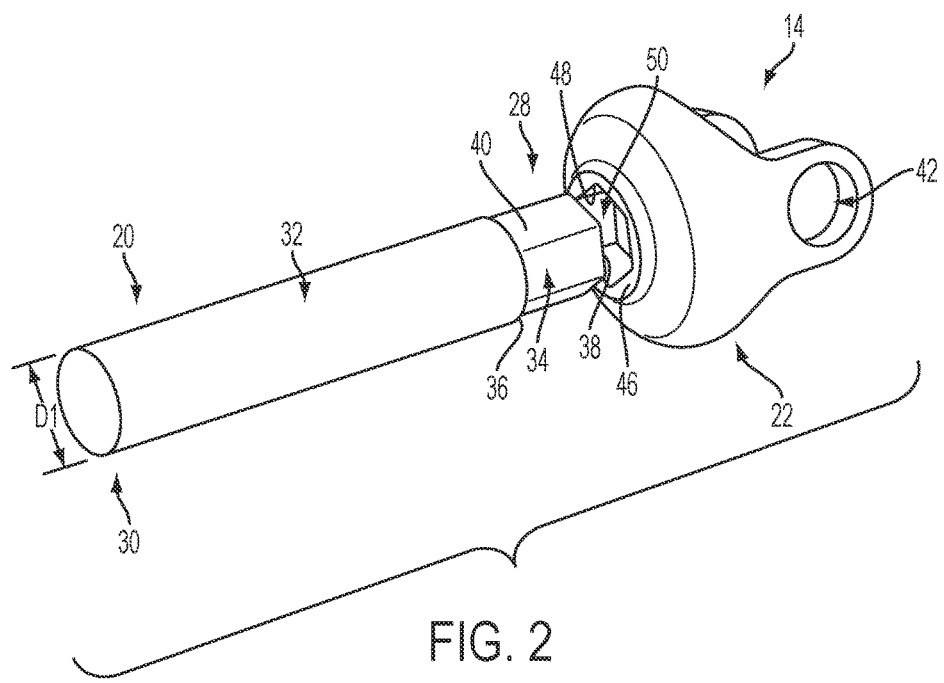
FIG. 2 is perspective view of the solid shaft sub-assembly shown in FIG. 1 before assembly.
Figure 3:
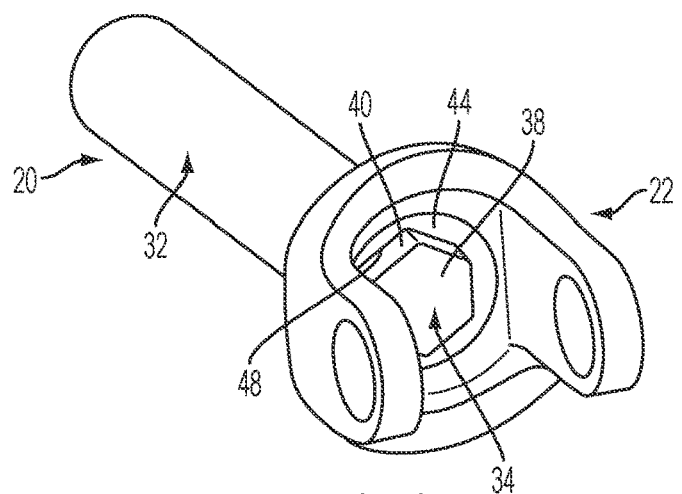
FIG. 3 is a perspective view of the solid shaft sub-assembly shown in FIG. 1 and during assembly.
Figure 4:
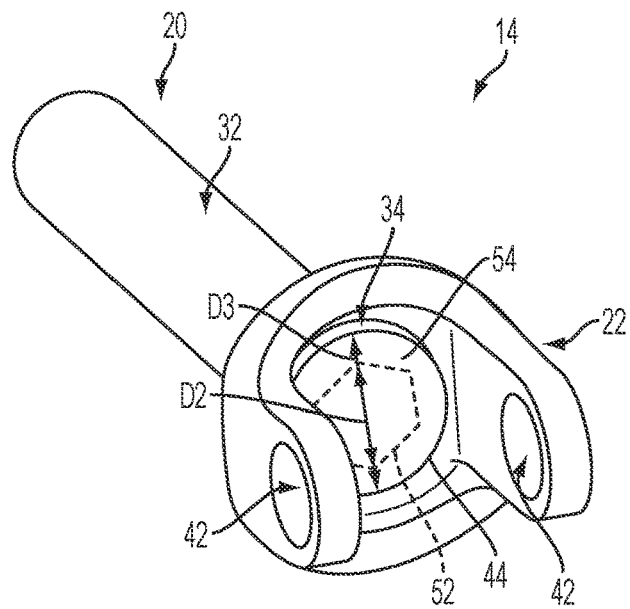
FIG. 4 is a perspective view of the solid shaft sub-assembly shown in FIGS. 2 and 3 and after assembly.

As illustrated in FIGS. 2-4, solid shaft sub-assembly 14 includes a solid shaft 20 and a yoke 22. Solid shaft 20 includes a first end 28 and a second end 30. First end 28 is configured for insertion into yoke 22 to facilitate coupling therebetween, and second end 30 is configured for insertion into tubular shaft open end 16 to facilitate coupling between solid shaft 20 and tubular shaft 12. Second end 30 may be coupled to tubular shaft 12 by any suitable means such as, for example, press-fitting or welding.

In the exemplary embodiment, solid shaft 20 is generally cylindrical and includes a first portion 32 having a first cross-section or diameter D1, a second portion 34 having a second cross-section or diameter D2. First diameter D1 is larger than second diameter D2 such that first portion 32 includes a shoulder 36, and second portion 34 includes an end face 38. However, solid shaft 20 may have alternative shapes such as, for example, a two-groove configuration (FIGS. 5-7) and a clover configuration (FIGS. 8-10).

Yoke 22 generally includes bearing holes 42, an inner surface 44, a bottom surface 46, and an inner wall 48 that defines an aperture 50. In the exemplary embodiment, aperture 50 has a non-circular cross-section. For example, as shown in FIGS. 1-4, aperture 50 is generally hexagonal. Alternatively, aperture 50 may have any suitable non-circular geometry that enables solid shaft sub-assembly 14 to function as described herein. For example, aperture 50 may include a two-groove or two-projection geometry (FIGS. 5-7), or a clover or four-projection geometry (FIGS. 8-10).

Figure 5:
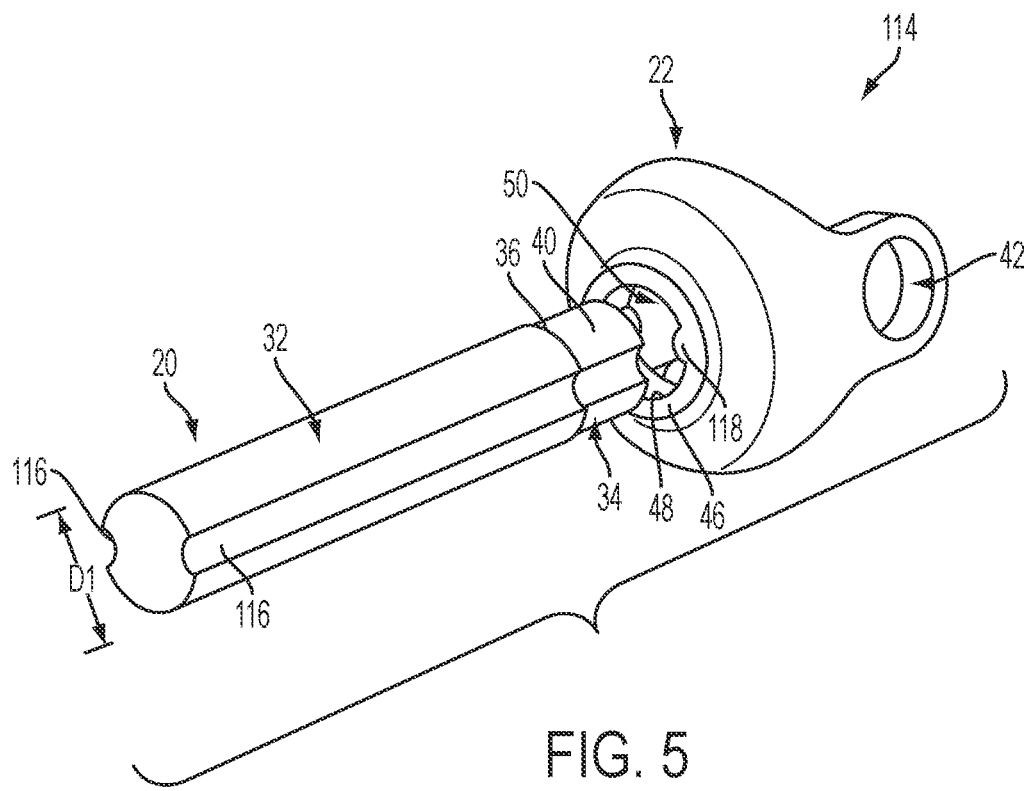
FIG. 5 is a perspective view of another exemplary solid shaft sub-assembly before assembly.
Figure 6:
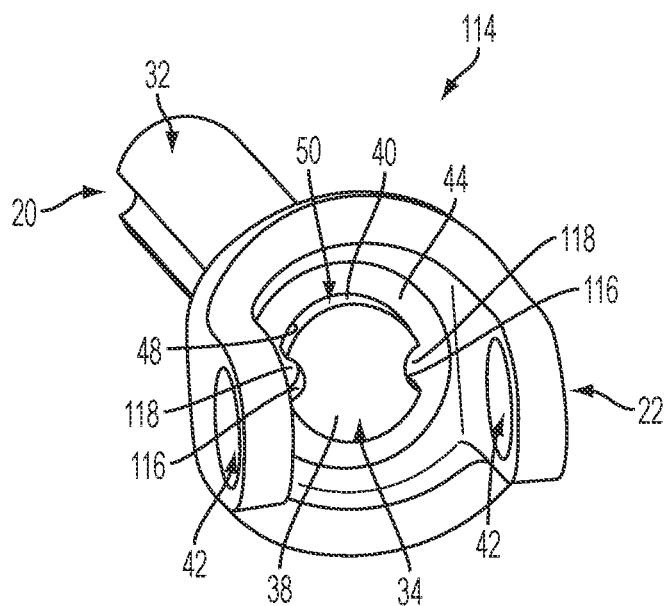
FIG. 6 is a perspective view of the solid shaft sub-assembly shown in FIG. 5 and during assembly.
Figure 7:
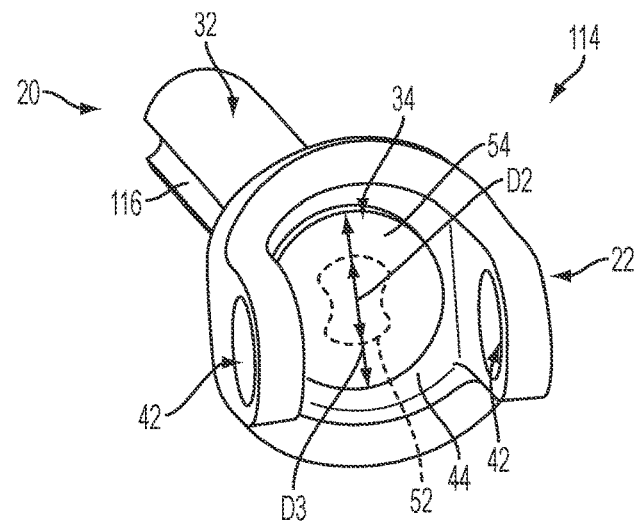
FIG. 7 is a perspective view of the solid shaft sub-assembly shown in FIGS. 5 and 6, and after assembly.

FIGS. 5-7 illustrate a solid shaft sub-assembly 114 that is similar to the solid shaft sub-assembly 14 shown in FIGS. 1-4, and like reference numerals indicate like parts. Sub-assembly 114 is similar to sub-assembly 14 except solid shaft 20 includes grooves 116 extending axially along the length of shaft 20, and yoke inner wall 48 includes projections 118 extending inwardly into aperture 50. Grooves 116 are configured to each receive a projection 118 when solid shaft second portion 34 is inserted into aperture 50.

Figure 8:
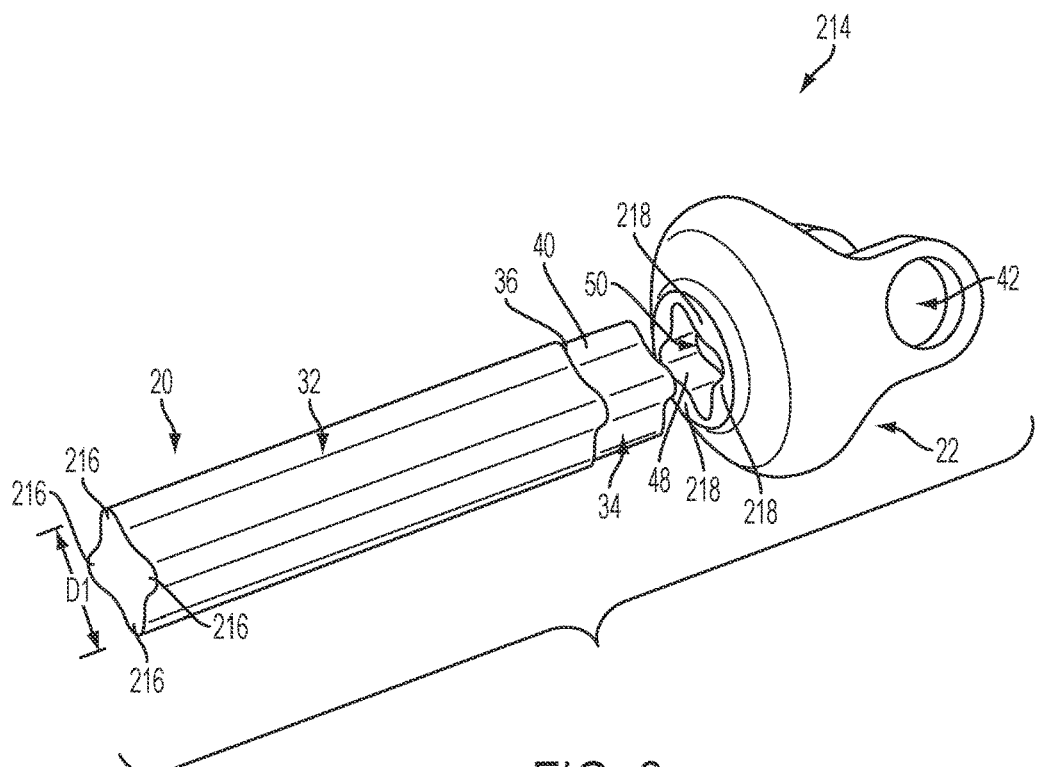
FIG. 8 is a perspective view of yet another exemplary solid shaft sub-assembly before assembly.
Figure 9:
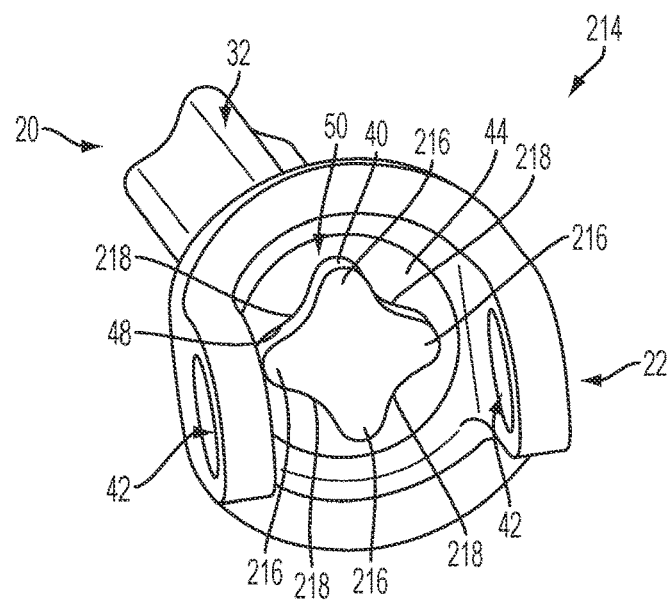
FIG. 9 is a perspective view of the solid shaft sub-assembly shown in FIG. 8 and during assembly.
Figure 10:
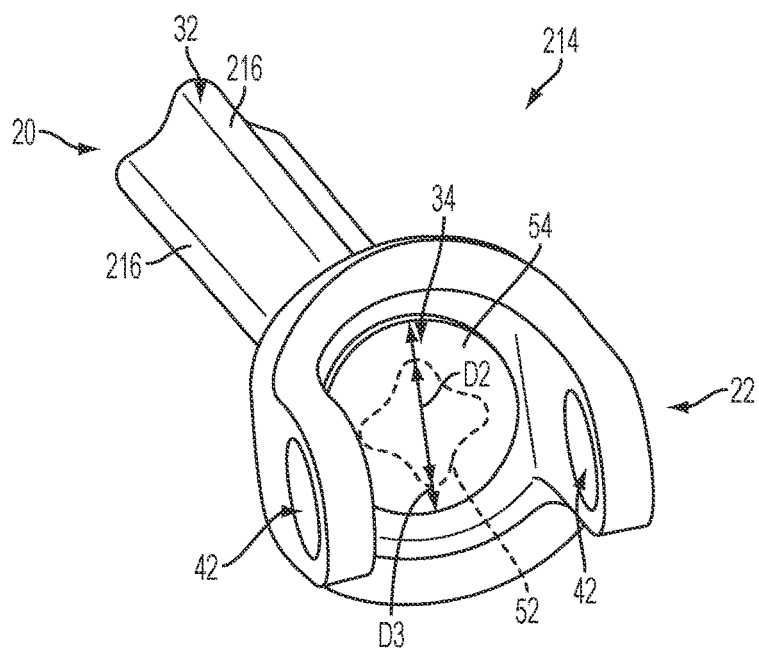
FIG. 10 is a perspective view of the solid shaft sub-assembly shown in FIGS. 8 and 9, and after assembly.

FIGS. 8-10 illustrate a solid shaft sub-assembly 214 that is similar to the solid shaft sub-assemblies 14, 114, and like reference numerals indicate like parts. Sub-assembly 214 is similar to sub-assemblies 14, 114 except solid shaft 20 includes projections 216 along the axial length of shaft 20, and yoke inner wall includes grooves 218 configured to receive projections 216 when solid shaft second portion 34 is inserted into aperture 50.

During assembly of the solid shaft sub-assembly 14, solid shaft 20 and yoke 22 are provided to a desired assembly location (not shown). For example, shaft 20 may be fixtured (i.e., secured) in an assembly machine (not shown) in a vertical position, and yoke 22 positioned in a desired orientation relative to solid shaft 20 and fixtured in the assembly machine to maintain the relative orientation to shaft 20. For example, yoke 22 may be positioned by hand in the desired orientation (see FIGS. 3, 6, 9) and then fixtured. Once solid shaft 20 and yoke 22 are fixtured, the assembly operation may begin.

In the exemplary embodiment, the assembly operation includes the hot upsetting of solid shaft second portion 34 to deform second portion 34 against yoke inner surface 44 (see. FIGS. 4, 7, 10) and/or fill the designed mating yoke geometry of aperture 50. As such, shaft second portion 34 is inserted into yoke aperture 50 until yoke bottom surface 46 abuts against the shoulder 36 of the solid shaft 20 and prevents further insertion of solid shaft 20 into yoke aperture 50.

Shaft second portion 34 is then heated and deformed to form an enlarged second portion end face 54 (FIGS. 4, 7, 10) and/or to fill any gaps present between second portion outer surface 40 and yoke inner wall 48. As such, shaft second portion 34 is formed with a cross-sectional profile 52 substantially complementary to the cross-sectional profile of aperture 50. For example, the assembly machine or other device may press against shaft end face 38 of the heated shaft second portion 34 such that a shaft second portion 34 is deformed back against yoke inner surface 44 and is forced radially outward against yoke inner wall 48. Alternatively, shaft second portion 34 may be heated first and subsequently inserted into yoke 22 and deformed.

Accordingly, the assembly operation forms cross-sectional profile 52 that is substantially complementary to the cross-sectional profile of aperture 50 such that shaft second portion outer surface 40 and yoke inner wall 48 are interlocked to facilitate increased torsional strength. This operation also facilitates preventing the need for machining operation, preventing the need for serrations on the shaft and yoke interfaces, preventing the need for staking operations, and providing increased axial retention between shaft 20 and yoke 22.

In one exemplary embodiment, a first electrode (not shown) is attached to shaft second portion 34 and a second electrode (not shown) is attached to yoke 22. Shaft second portion 34 is inserted into yoke aperture 50 (see FIGS. 3, 6, 9) and an electrical current is directed from the first electrode to the second electrode through both solid shaft 20 and yoke 22. A resistance is created between portions of shaft second portion 34 and yoke 22 that are in contact, which subsequently heats shaft second portion 34 to a temperature at which it can be deformed (e.g., when second portion 34 glows red or orange). A cylinder (not shown) is then pressed against second portion end face 38 and at least a portion of shaft 20 is pressed and deformed against yoke inner face 44 and inner wall 48.

After the pressing operation, shaft second portion 34 subsequently includes an enlarged end face 54 having a diameter D3 (FIGS. 4, 7, 10). End face diameter D3 is larger than the cross-sectional geometry of yoke aperture 50 such that end face 54, along with solid shaft shoulder 36, facilitates preventing removal of shaft 20 from yoke 22 in the axial direction.

Described herein are systems and methods for assembling a solid shaft and yoke sub-assembly of an I-shaft. A portion of the solid shaft is heated and inserted through an aperture of the yoke. The heated portion is then deformed such that it overlaps the yoke geometry and/or fills gaps between the solid shaft and a yoke inner wall that defines the aperture. The deformed portion of the solid shaft is consequently larger than the yoke aperture to improve axial retention of the shaft in the yoke, and/or the deformed portion conforms to the non-circular geometry of the yoke inner wall to improve torsional strength between the solid shaft and the yoke. The non-circular geometry may be, for example, hexagonal, grooved, or have a clover shape. As such, the I-shaft assembly provides improved orientation variance between the yoke and solid shaft, an increased axial retention force resistance to failure, a yoke-to-shaft connection that does not require separate manufacturing operations for torsional and axial retention features, a yoke-to-shaft connection that does not need a redundant axial retention feature, and multiple measureable locations to validate the integrity of the yoke-to-shaft connection.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A solid shaft sub-assembly comprising:
a solid shaft having a first portion with a first cross-section diameter, a second portion with a second cross-section diameter that is less than the first cross-section diameter, and a shoulder extending between the first portion and the second portion, the shoulder extends around an entire outer peripheral surface of the solid shaft; and
a yoke comprising an aperture that is defined by an inner wall that extends from a bottom surface of the yoke towards an end of the yoke, the aperture being arranged to receive the second portion of the solid shaft and at least one projection extending radially inward into the aperture, the aperture having a non-circular first cross-sectional profile, wherein the solid shaft second portion is positioned within the aperture such that the shoulder abuts the bottom surface and is deformed such that the second portion is formed with a second cross-sectional profile complementary to the first cross-sectional profile to axially and torsionally couple the solid shaft to the yoke, the second cross-sectional profile includes at least one groove extending along a length of the solid shaft, the at least one groove receives the at least one projection.

2. The sub-assembly of claim 1, wherein the solid shaft is coupled to the yoke by inserting the shaft into the aperture and subsequently heating the solid shaft such that the second portion of the solid shaft is deformed into the yoke aperture cross-sectional profile.

3. The sub-assembly of claim 2, wherein the solid shaft is heated by directing current through the solid shaft.

4. The sub-assembly of claim 1, wherein an end of the deformed second portion has a third cross-sectional profile that is larger than the first cross-sectional profile.

5. The sub-assembly of claim 1, wherein the solid shaft first portion has a first diameter and the solid shaft second portion has a second diameter, the first diameter being larger than the second diameter.

6. An intermediate shaft for a steering column assembly, the intermediate shaft comprising:
a tubular shaft;
a solid shaft having a first groove and a second groove each extending along the solid shaft, the solid shaft having a first portion with a first cross-section diameter that is inserted into the tubular shaft, a second portion extending from the first portion and with a second cross-section diameter that is less than the first cross-section diameter, the first groove and the second groove extending through the first portion and the second portion; and
a yoke comprising an inner wall defining an aperture to receive the second portion, a first protrusion that is received within the first groove, and a second projection that is received within the second groove, the aperture having a non-circular first cross-sectional profile, wherein the second portion is positioned within the aperture such that the shoulder abuts a bottom surface of the yoke and is deformed such that the second portion is formed with a second cross-sectional profile complementary to the first cross-sectional profile to axially and torsionally couple the solid shaft to the yoke.

7. The intermediate shaft of claim 6, wherein the solid shaft is coupled to the yoke by inserting the shaft into the aperture and subsequently heating the solid shaft such that the portion of the solid shaft is deformed into the yoke aperture cross-sectional profile.

8. The intermediate shaft of claim 7, wherein the solid shaft is heated by directing current through the solid shaft.

9. A method of assembling a solid shaft sub-assembly, the method comprising:
providing a solid shaft having a first portion with a first cross-section diameter, a second portion with a second cross-section diameter that is less than the first cross-section diameter, and a shoulder extending between the first portion and the second portion, the shoulder extends around an entire outer peripheral surface of the solid shaft;
providing a yoke comprising an aperture that is defined by an inner wall that extends from a bottom surface of the yoke towards an end of the yoke, the aperture being arranged to receive the second portion of the solid shaft and at least one projection extend radially inward into the aperture, the aperture having a non-circular first cross-sectional profile;
positioning the solid shaft second portion in the aperture such that the shoulder abuts the bottom surface; and
axially and torsionally coupling the solid shaft to the yoke by deforming the solid shaft first portion such that the first portion is formed with a second cross-sectional profile complementary to the first cross-sectional profile, the second cross-sectional profile includes at least one groove extending along a length of the solid shaft, the at least one groove receives the at least one projection.

10. The method of claim 9, further comprising heating the solid shaft first portion prior to deforming the solid shaft first portion.

11. The method of claim 10, wherein the step of heating the solid shaft first portion comprises directing current through the solid shaft first portion to heat the first portion.

12. The method of claim 10, wherein the step of deforming the solid shaft first portion comprises performing a pressing operation on the heated first portion, wherein an end of the deformed first portion has a third cross-sectional profile that is larger than the first cross-sectional profile.

* * * * *